(12) United States Patent
Grant et al.

(10) Patent No.: US 6,272,850 B1
(45) Date of Patent: Aug. 14, 2001

(54) CATALYTIC CONVERTER TEMPERATURE CONTROL SYSTEM AND METHOD

(75) Inventors: Robert Michael Grant, Farmington Hills; Eugene S. Zimmerman, Riverview; Michael John Cullen, Northville; Patrick Joseph Curran, Farmington Hills; Richard Tuttle, Utica, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/207,385

(22) Filed: Dec. 8, 1998

(51) Int. Cl.[7] .................................................. F01N 3/00
(52) U.S. Cl. ............................... 60/277; 60/274; 60/286; 60/285
(58) Field of Search ............................. 60/274, 285, 286, 60/277, 276

(56) References Cited

U.S. PATENT DOCUMENTS

| | | |
|---|---|---|
| 4,729,220 | 3/1988 | Teraska et al. . |
| 5,158,063 | 10/1992 | Hosoda et al. . |
| 5,211,010 | 5/1993 | Hirota ....................................... 60/280 |
| 5,404,719 * | 4/1995 | Araki et al. .............................. 60/276 |
| 5,414,994 | 5/1995 | Cullen et al. . |
| 5,511,378 | 4/1996 | Lindlbauer et al. . |
| 5,642,705 * | 7/1997 | Morikawa et al. ................... 123/300 |
| 5,784,880 | 7/1998 | Toshiro et al. . |
| 5,975,046 * | 11/1999 | Kaneko et al. ....................... 123/300 |
| 6,041,591 * | 3/2000 | Kaneko et al. ......................... 60/274 |
| 6,044,642 * | 4/2000 | Nishimura et al. ..................... 60/285 |

* cited by examiner

Primary Examiner—Thomas Denion
Assistant Examiner—Binh Tran
(74) Attorney, Agent, or Firm—John D. Russell; John H. Buckert

(57) ABSTRACT

An electronic engine controller controls the catalytic converter temperature by generating a desired rich air/fuel ratio that will maintain the catalytic converter at a predetermined temperature. The actual air/fuel ratio is ramped to the desired air/fuel ratio at a first rate when the catalytic converter temperature is greater than a first predetermined temperature. The actual air/fuel ratio is ramped to the desired air/fuel ratio at a second rate when the catalytic converter temperature is greater than a second predetermined temperature but less than the first predetermined temperature.

20 Claims, 4 Drawing Sheets

CATALYTIC CONVERTER TEMPERATURE CONTROL SYSTEM AND METHOD

FIELD OF THE INVENTION

The present invention relates to a catalytic converter temperature control system and method for controlling the delivery of fuel to an internal combustion engine to protect the catalytic converter from degradation due to high temperature exposure.

BACKGROUND OF THE INVENTION

Modern automotive engines typically utilize a catalytic converter to reduce regulated exhaust gases produced by the engine. Such converters operate to chemically alter the exhaust gas composition produced by the engine. Catalytic converters typically operate at peak efficiency when the temperature of the catalytic material within the converter is within a certain specified range. Continued operation of the converter at a temperature greater than the specified temperature range, however, leads to degradation of the catalytic converter material within the converter. Such degradation leads to reduced converter operating life.

One method to limit the converter temperature is to ramp the engine air/fuel ratio injected into the engine to a value rich of stoichiometry that will maintain the temperature at the maximum when the conditions are such that normal stoichiometric operation would cause the temperature to exceed the maximum allowable temperature. The ramping rate of the air/fuel ratio that is injected is a fixed value and is large enough that the converter temperature does not exceed the maximum allowable temperature. Further, a single predetermined temperature limit is used. Such a system is described in U.S. Pat. No. 5,414,994.

The inventors herein have recognized a disadvantage with the above approach. During certain operating conditions, especially high load and high speed operation, the necessary enrichment to maintain the converter temperature at or below the predetermined temperature limit causes an increase in certain regulated exhaust gases. Further, the enrichment also decreases fuel economy.

SUMMARY OF THE INVENTION

An object of the invention claimed herein is to provide a system and method to control the temperature of a catalytic converter such that catalytic converter efficiency is maintained while minimizing the regulated exhaust gases caused by fuel enrichment.

In one particular aspect of the invention, this object is achieved, and disadvantages of prior approaches overcome by a method for preventing degradation of efficiency of an emission control device due to temperature exposure by controlling air/fuel ratio of an air/fuel ratio mixture inducted into an internal combustion engine having an exhaust coupled to the emission control device. The method comprises the steps of determining temperature within said the emission control device, generating a desired rich air/fuel ratio reference value that will maintain the emission control device near a predetermined temperature, ramping the air/fuel ratio to said desired rich air/fuel ratio reference value at a first ramping rate when said temperature is greater than a first predetermined threshold, and ramping the air/fuel ratio to said desired rich air/fuel ratio reference value at a second ramping rate when said temperature is greater than a second predetermined threshold and less than said first predetermined threshold.

By using two temperature regions and a different ramping rate in each, the converter temperature is controlled to the same temperature limit as attempted by prior approaches, but momentarily exceeds this limit while never exceeding a higher limit. This is an acceptable solution because the lower temperature limit represents a temperature at which the converter can operate at indefinitely while incurring no degradation. However, the converter can tolerate higher temperatures without degradation, provided the exposure is only for a short period of time. Therefore, employing multiple temperature bands with varying ramping rates allows for optimization of fuel economy and emissions, while maintaining the integrity of the converter.

An advantage of the above aspect of the invention is improved fuel economy.

Another advantage of the above aspect of the invention is improved emission control.

Other objects, features and advantages of the present invention will be readily appreciated by the reader of this specification.

BRIEF DESCRIPTION OF THE DRAWINGS

The object and advantages described herein will be more fully understood by reading an example of an embodiment in which the invention is used to advantage, referred to herein as the Description of the Preferred Embodiment, with reference to the drawings wherein.

DESCRIPTION OF THE PREFERRED EMBODIMENTS

Figure 1:
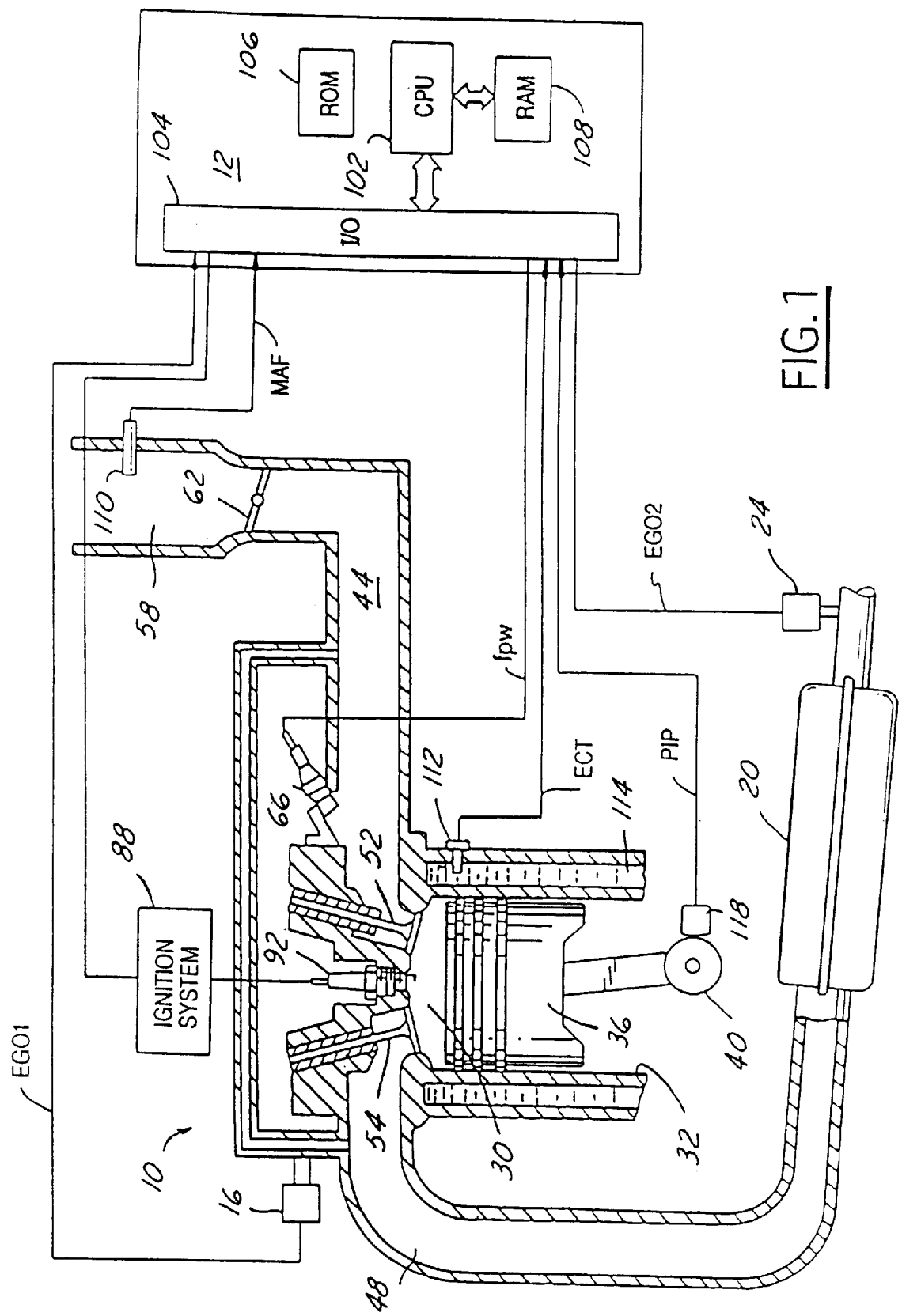
FIG. 1 is a block diagram of an engine in which the invention is used to advantage.

Internal combustion engine 10 comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Intake manifold 44 is shown communicating with throttle body 58 via throttle plate 62. Intake manifold 44 is also shown having fuel injector 66 coupled thereto for delivering liquid fuel in proportion to the pulse width of signal FPW from controller 12. Fuel is delivered to fuel injector 66 by a conventional fuel system (not shown) including a fuel tank, fuel pump, and fuel rail (not shown).

Conventional distributorless ignition system 88 provides ignition spark to combustion chamber 30 via spark plug 92 in response to controller 12. Two-state exhaust gas oxygen sensor 16 is shown coupled to exhaust manifold 48 upstream of catalytic converter 20. Two-state exhaust gas oxygen sensor 24 is shown coupled to exhaust manifold 48 downstream of catalytic converter 20. Sensor 16 provides signal EGO1 to controller 12 which converts signal EGO1 into two-state signal EGOS1. A high voltage state of signal EGOS1 indicates exhaust gases are rich of a reference air/fuel ratio and a low voltage state of converted signal EGO1 indicates exhaust gases are lean of the reference air/fuel ratio. Sensor 24 provides signal EGO2 to controller 12 which converts signal EGO2 into two-state signal EGOS2. A high voltage state of signal EGOS2 indicates exhaust gases are rich of a reference air/fuel ratio and a low voltage state of converted signal EGO1 indicates exhaust gases are lean of the reference air/fuel ratio.

Controller 12 is shown in FIG. 1 as a conventional microcomputer including: microprocessor unit 102, input/output ports 104, read only memory 106, random access memory 108, and a conventional data bus. Controller 12 is shown receiving various signals from sensors coupled to engine 10, in addition to those signals previously discussed, including: measurements of inducted mass air flow (MAF) from mass air flow sensor 110 coupled to throttle body 58; engine coolant temperature (ECT) from temperature sensor 112 coupled to cooling sleeve 114; and a profile ignition pickup signal (PIP) from Hall effect sensor 118 coupled to crankshaft 40.

Figure 2:
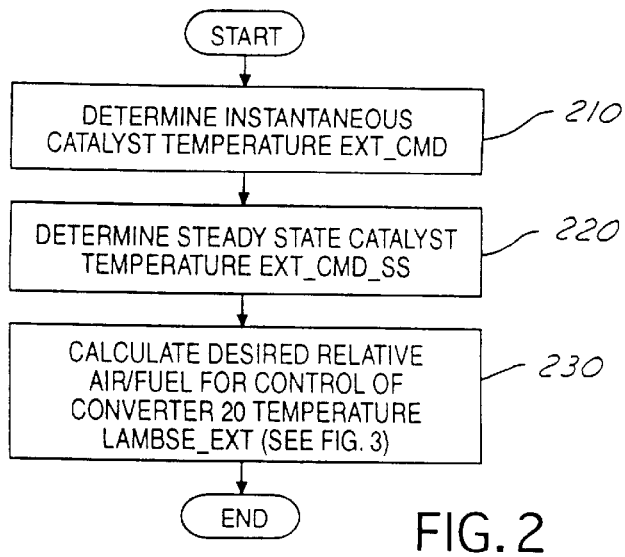
FIGS. 2–5 are a high level flowcharts of various operations performed by a portion of the embodiment shown in FIG. 1.

Referring to FIG. 2, a routine for calculating a desired relative air/fuel ratio (lambse) is now described. In step 210 an instantaneous temperature of catalytic converter 20 is determined by using a temperature sensor or inferring the temperature using methods known to those skilled in the art as described in U.S. Pat. No. 5,414,994, which is incorporated herein by reference. Then, in step 220, a steady state temperature of catalytic converter 20 is determined by using a filtered temperature sensor or filtering the inferred temperature using methods known to those skilled in the art as described in U.S. Pat. No. 5,414,994. In step 230, a desired relative air/fuel ratio (lambse_ext) for control of catalytic converter 20 temperature is calculated as described later herein with particular reference to FIGS. 3 and 4. The desired air fuel ratio is maintained either using closed loop control or open loop control. When using open loop control, signals MAF and engine speed are used to calculate an inducted fresh cylinder air charge. Then, using this value and the desired relative air/fuel ratio along with the stoichiometric air fuel ratio for the fuel type being burned, a fuel injector pulse width FPW is calculated using methods known to those skilled in the art. When using closed loop control, this open loop calculation is augmented with feedback values derived from exhaust gas oxygen sensors 16 and 24 using methods known to those skilled in the art.

Figure 3:
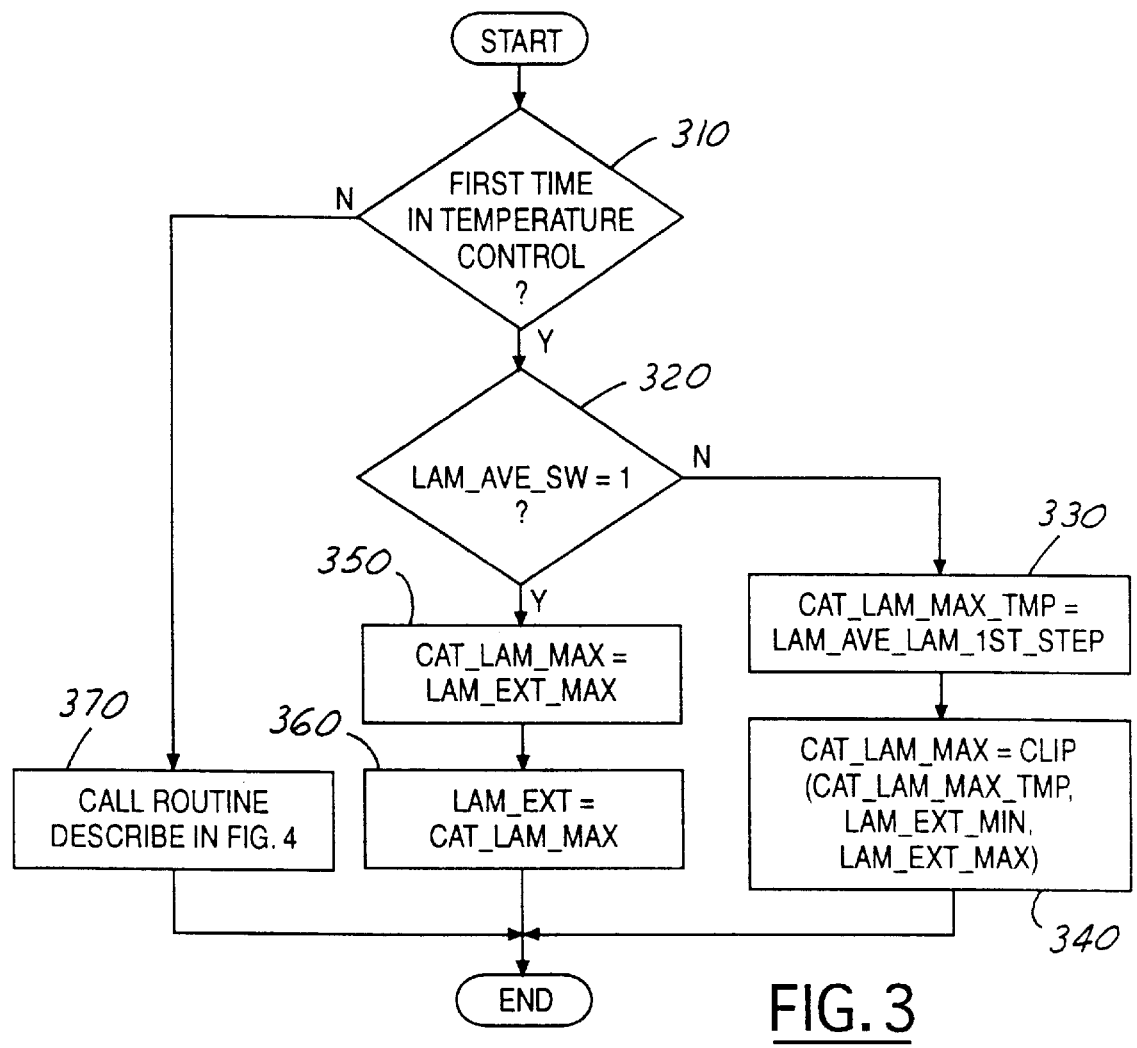

Referring now to FIG. 3, a flowchart of a routine performed by controller 12 to calculate a desired relative air/fuel ratio command when first entering catalytic converter temperature control is described. In step 310 a determination is made as to whether this is the first time that controller 12 is controlling the temperature of catalytic converter 20. If the answer to step 310 is YES, then a determination is made as to whether calabratable parameter LAM_AVE_SW is set to 1. When LAM_AVE_SW is set to 1, the routine continues to step 330 where temporary maximum air/fuel ratio cat_lam_max tmp is set to average air/fuel ratio lamave minus calabratable parameter LAM_1ST_STEP. In the case of a V-type engine, lamave is the average air fuel ratio of the left and right banks. Then, in step 340, temporary maximum air/fuel ratio cat_lam_max_tmp is clipped between minimum value LAM_EXT_MIN and maximum value LAM_EXT_MAX. When LAM_AVE_SW is not set to 1, the routine continues to step 350 where maximum air/fuel ratio cat_lam_max is set to maximum value LAM_EXT_MAX. Following either step 340 or 350, lambse_ext is set to cal_lam_max in step 360. If the answer in step 310 is NO, then the routine described later herein with particular reference to FIG. 4 is called in step 370.

Figure 4:
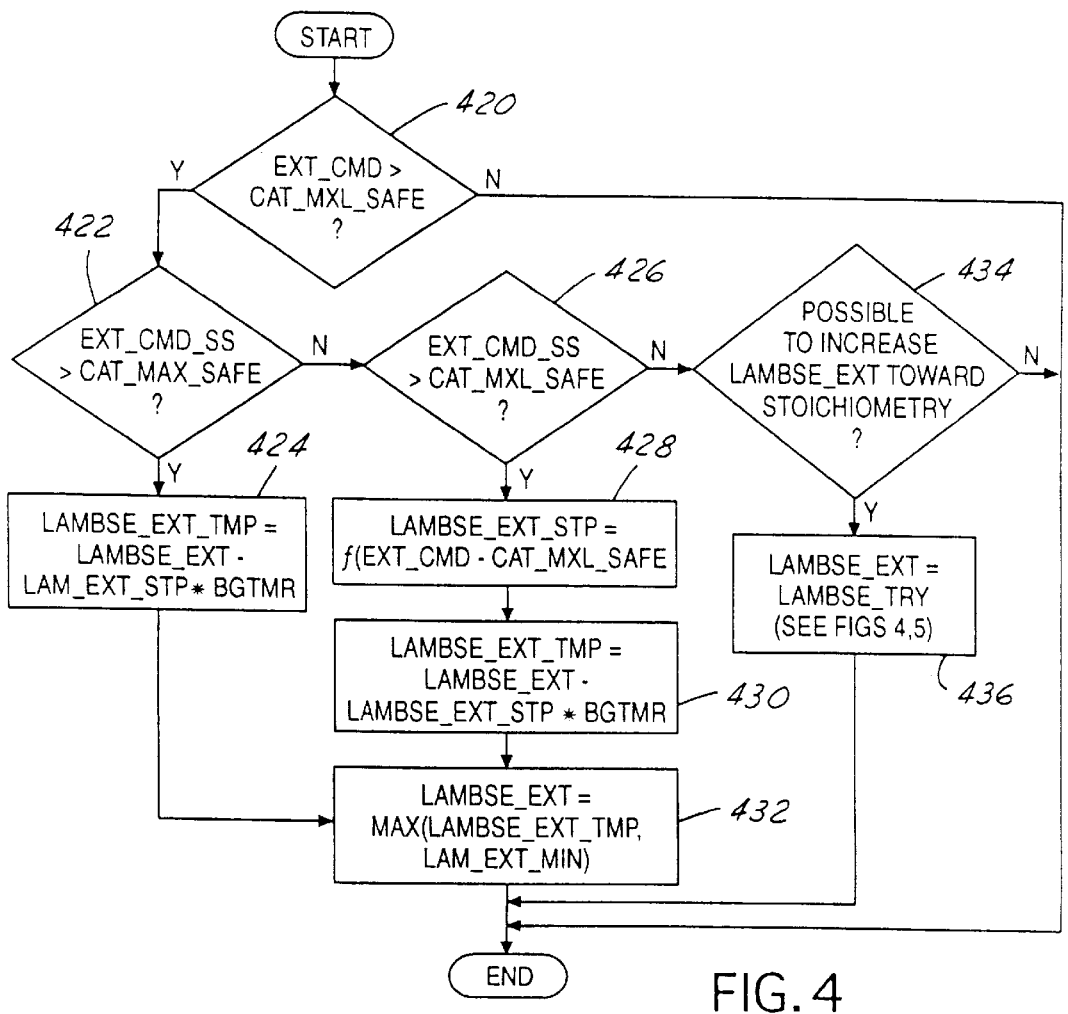

Referring now to FIG. 4, a flowchart of a routine performed by controller 12 to calculate a desired relative air/fuel ratio command to control catalytic converter temperature is described. In step 420, it is determined whether instantaneous catalytic converter temperature, ext_cmd, is greater than predetermined lower threshold temperature, cat_mxl_safe. Predetermined lower threshold temperature, cat_mxl_safe, represents a temperature at which converter 20 can operate at indefinitely with no loss of efficiency. If the answer to step 420 is NO, then the routine ends. If the answer to step 420 is YES, then in step 422 it is determined whether steady state catalytic converter temperature, ext_cmd_ss, is greater than predetermined higher threshold temperature, cat_max_safe. The predetermined higher threshold temperature represents a temperature at which converter 20 will experience loss of efficiency if exposed for even a very short period of time. If the answer to step 422 is YES, then the temporary desired relative air/fuel ratio lambse_ext_tmp is generated by subtracting the multiplication of LAM_EXT_STEP*bgtmr from lambse_ext as shown in step 424, where LAM_EXT_STEP represents a ramping rate and bgtmr is a timer value. When the answer to step 422 is NO, it is determined in step 426 whether steady state catalytic converter temperature, ext_cmd_ss, is greater than predetermined lower threshold temperature, cat_mxl_safe. A temperature between the predetermined lower threshold temperature and the predetermined higher threshold represents a temperature at which converter 20 can be exposed for a certain period of time. When the answer to step 426 is YES, a second ramping rate lambse_ext_stp is determined as a function of ext_cmd and cat_mxl_safe, as shown in step 428. Then, in step 430, the temporary desired relative air/fuel ratio lambse_ext_tmp is generated by subtracting the multiplication of lambse_ext_stp*bgtmr from lambse_ext. In step 432, lambse_ext_tmp, as calculated in either step 430 or 424, is clipped to a minimum value LAM_EXT_MIN. If the answer in step 426 is NO, then in step 434 a determination is made as to whether it is possible to increase the desired relative air/fuel ratio toward the stoichiometric value, as described in U.S. Pat. No. 5,414,994. If the answer to step 434 is YES, then in step 436 lambse_ext is set to lambse_try, where lambse_try is described later herein with particular reference to FIGS. 5.

Figure 5:
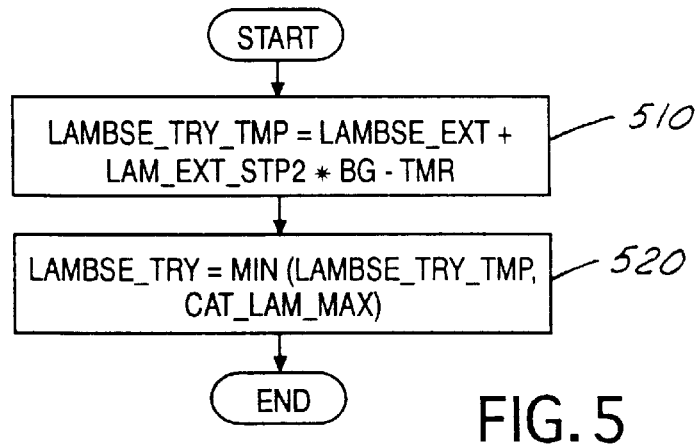

Referring now to FIG. 5, a flowchart of a routine performed by controller 12 to lambse_try is described. In step 510, temporary value lambse_try_tmp is set to lambse_ext plus LAM_EXT_STP2 times bg_tmr, where LAM_EXT_STP2 is a desired ramping rate for returning to stoichiometry. Then, in step 520, lambse_try is set to the minimum of lambse_try_tmp and cat_lam_max.

Figure 6A:
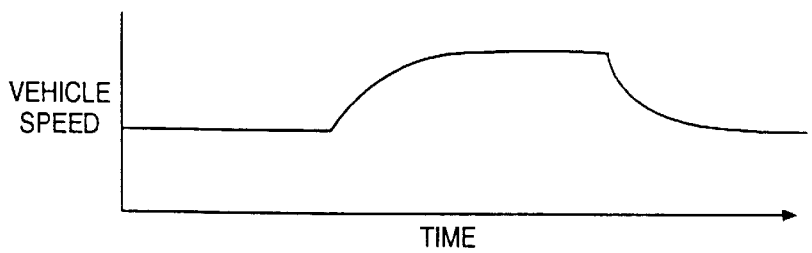
FIGS. 6–7 are plots showing examples in which the invention is used to advantage.
Figure 6B:
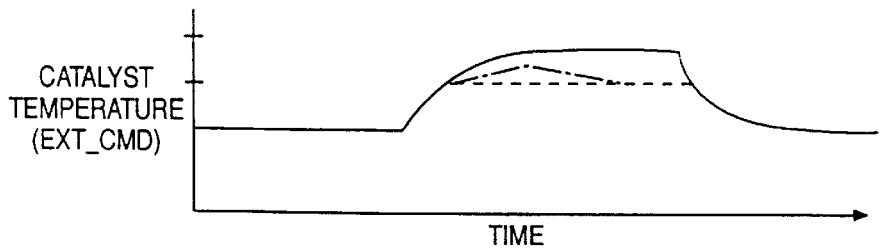
Figure 6C:
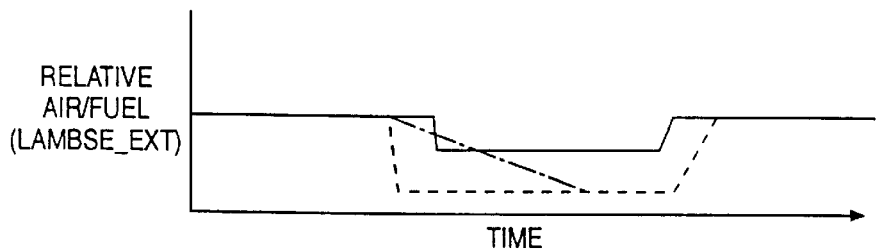

Referring now to FIG. 6, a plot is shown describing a typical scenario in which the present invention is used to advantage. The top graph in FIG. 6a shows a vehicle speed trajectory versus time. The vehicle begins traveling at a constant speed and then increases speed to a second higher speed. Then, the vehicle decelerates to the original speed. The middle graph in FIG. 6b shows the instantaneous catalytic converter temperature ext_cmd as measured by a sensor or estimated, corresponding to different control strategies described later herein and the vehicle speed profile of the top graph. The lower graph in FIG. 6c shows the desired relative air/fuel ratio corresponding to different control strategies described later herein and the vehicle speed profile of the top graph.

Continuing with FIG. 6b, the dashed line represents the use of prior art in which the maximum allowable temperature is set to a lower limit so that indefinite exposure does not cause degradation to converter 20. The dashed line in FIG. 6c is the necessary desired relative air/fuel ratio to maintain that temperature. In this case, when ext_cmd reaches the safe limit, the desired relative air/fuel is quickly ramped to a level that will maintain the temperature of converter 20 at this temperature until conditions are reached in which it is acceptable to resume stoichiometric operation. The solid line in FIG. 6b represents the use of prior art in which the maximum allowable temperature is set to a higher limit so that only short exposure is acceptable to prevent degradation to converter 20. The solid line in FIG. 6c is the necessary desired relative air/fuel ratio to maintain the higher temperature. In this case, when ext_cmd reaches the higher temperature limit, the desired relative air/fuel is quickly ramped to a less rich level that will maintain the temperature of converter 20 at this higher temperature until conditions are reached in which it is acceptable to resume stoichiometric operation. Setting the maximum allowable temperature to a higher lever requires less enrichment; however, this may result in degradation to converter 20 depending on the time of exposure. According to the present invention, which is represented by the dash dot lines in FIGS. 4b and 4c, when ext_cmd reaches the lower limit, the desired relative air/fuel is ramped at a first relatively slow ramp rate to a level that will maintain the temperature of converter 20 at the lower temperature. If ext_cmd had reached the higher temperature, as described later herein with particular reference to FIG. 7, then the desired relative air/fuel would be ramped at a second relatively fast ramp rate to a level that will maintain the temperature of converter 20 at the lower temperature. This strategy allows a short, repeatable overshoot of ext_cmd that is acceptable in terms of converter 20 durability, while requiring less enrichment.

Figure 7A:
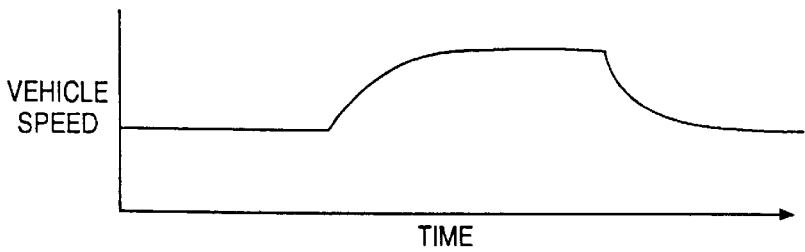
Figure 7B:
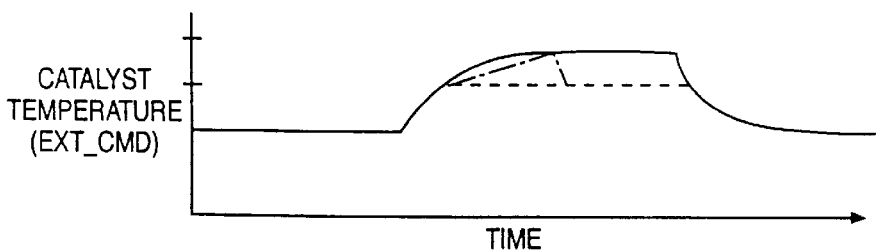
Figure 7C:
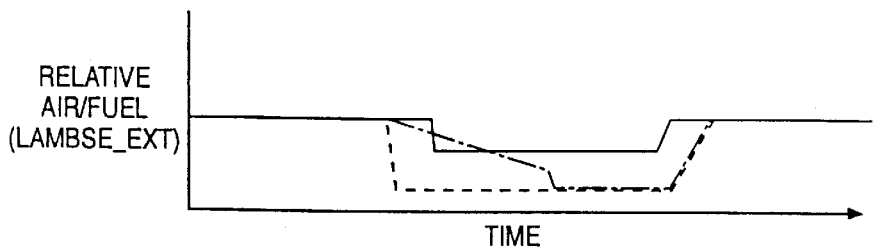

Referring now to FIG. 7, a plot is shown describing a typical scenario in which the present invention is used to advantage. Referring now specifically to FIG. 7a, the graph shows a vehicle speed trajectory versus time. The vehicle begins traveling at a constant speed and then increases speed to a second higher speed. Then, the vehicle decelerates to the original speed. The middle graph, FIG. 7b, shows the instantaneous catalytic converter temperature ext_cmd as measured by a sensor or estimated, corresponding to different control strategies described later herein and the vehicle speed profile of the top graph. The lower graph, FIG. 7c, shows the desired relative air/fuel ratio corresponding to different control strategies described later herein and the vehicle speed profile of the top graph.

Continuing with FIG. 7b, the dashed line represents the use of prior art in which the maximum allowable temperature is set to a lower limit so that indefinite exposure does not cause degradation to converter 20. The dashed line in FIG. 7c is the necessary desired relative air/fuel ratio to maintain that temperature. In this case, when ext_cmd reaches the safe limit, the desired relative air/fuel is quickly ramped to a level that will maintain the temperature of converter 20 at this temperature until conditions are reached in which it is acceptable to resume stoichiometric operation. The solid line in FIG. 7b represents the use of prior art in which the maximum allowable temperature is set to a higher limit so that only short exposure is acceptable to prevent degradation to converter 20. The solid line in FIG. 7c is the necessary desired relative air/fuel ratio to maintain the higher temperature. In this case, when ext_cmd reaches the higher temperature limit, the desired relative air/fuel is quickly ramped to a less rich level that will maintain the temperature of converter 20 at this higher temperature until conditions are reached in which it is acceptable to resume stoichiometric operation. Setting the maximum allowable temperature to a higher lever requires less enrichment; however, this may result in degradation to converter 20, depending on the time of exposure. According to the present invention, which is represented by the dash dot lines of FIGS. 5b and 5c, when ext_cmd reaches the lower limit, the desired relative air/fuel is ramped at a first relatively slow ramp rate to a level that will maintain the temperature of converter 20 at the lower temperature. However, due to the dynamic nature of the systems, ext_cmd reaches the higher temperature. According to the present invention, the desired relative air/fuel ratio is then ramped at a second relatively fast ramp. This strategy allows a short, repeatable overshoot of ext_cmd that is acceptable in terms of converter 20 durability, while requiring less enrichment. In a preferred embodiment, the first relatively slow ramp rate is determined based on amount of change of the desired relative air/fuel ratio and the amount of time that converter 20 can withstand exposure to the higher temperature without degradation.

While the best mode for carrying out the invention has been described in detail, those skilled in the art in which this invention relates will recognize various alternative designs and embodiments, including those mentioned above, in practicing the invention that has been defined by the following claims.

What is claimed is:

1. A method for preventing degradation of efficiency of an emission control device due to temperature exposure by controlling air/fuel ratio of an air/fuel ratio mixture inducted into an internal combustion engine having an exhaust coupled to the emission control device, said method comprising the steps of:

determining a temperature within the emission control device;

generating a desired rich air/fuel ratio reference value that will maintain the emission control device near a predetermined temperature;

ramping the air/fuel ratio to said desired rich air/fuel ratio reference value at a first ramping rate when said temperature is greater than a first predetermined threshold; and ramping the air/fuel ratio to said desired rich air/fuel ratio reference value at a second ramping rate when said temperature is greater than a second predetermined threshold and less than said first predetermined threshold.

2. The method recited in claim 1 wherein said emission control device is a catalytic converter.

3. The method recited in claim 1 wherein said second ramping rate is determined based on a difference between said temperature and said second predetermined threshold.

4. The method recited in claim 1 further comprising the step of limiting said desired rich air/fuel ratio reference value to a minimum predetermined limit value.

5. The method recited in claim 1 wherein said second predetermined threshold is equal to said predetermined temperature.

6. The method recited in claim 1 wherein said second predetermined threshold represents a threshold temperature that if the emission control device is exposed to for a continuous period, the emission control device will operate without loss of efficiency.

7. The method recited in claim 1 wherein said temperature represents a steady state temperature within the emission control device.

8. The method recited in claim 1 wherein said temperature represents an instantaneous temperature within the emission control device.

9. A method for preventing degradation of efficiency of an emission control device due to temperature exposure by controlling air/fuel ratio of an air/fuel ratio mixture inducted into an internal combustion engine having an exhaust coupled to the emission control device, said method comprising the steps of:

determining an instantaneous temperature of a point within the emission control device;

generating a desired rich air/fuel ratio reference value that will maintain the emission control device near a predetermined temperature;

determining a steady state temperature of a point within the emission control device;

ramping the air/fuel ratio to said desired rich air/fuel ratio reference value at a first ramping rate when said steady state temperature is greater than a first predetermined threshold and said instantaneous temperature is greater than a second predetermined threshold; and ramping the air/fuel ratio to said desired rich air/fuel ratio reference value at a second ramping rate when said steady state temperature is greater than a second predetermined threshold and less than said first predetermined threshold and said instantaneous temperature is greater than said second predetermined threshold.

10. The method recited in claim 9 wherein said emission control device is a catalytic converter.

11. The method recited in claim 10 wherein said second ramping rate is determined based on a difference between said instantaneous temperature and said second predetermined threshold.

12. The method recited in claim 10 further comprising the step of limiting said desired rich air/fuel ratio reference value to a minimum predetermined limit value.

13. The method recited in claim 10 wherein said second predetermined threshold is equal to said predetermined temperature.

14. The method recited in claim 9 wherein said second predetermined threshold represents a threshold temperature to which the emission control device can be exposed for an indefinite period without loss of efficiency.

15. A system for controlling air/fuel ratio of an air/fuel ratio mixture inducted into an internal combustion engine, said system comprising;

an emission control device;

an exhaust of the engine coupled to said emission control device; and a controller for determining an instantaneous temperature of a point within the emission control device, generating a desired rich air/fuel ratio reference value that will maintain the emission control device near a predetermined temperature, determining a steady state temperature of a point within the emission control device, ramping the air/fuel ratio to said desired rich air/fuel ratio reference value at a first ramping rate when said steady state temperature is greater than a first predetermined threshold and said instantaneous temperature is greater than a second predetermined threshold, and ramping the air/fuel ratio to said desired rich air/fuel ratio reference value at a second ramping rate when said steady state temperature is greater than a second predetermined threshold and less than said first predetermined threshold and said instantaneous temperature is greater than said second predetermined threshold.

16. The system recited in claim 15 wherein said emission control device is a catalytic converter.

17. The system recited in claim 16 wherein said controller further determines said second ramping rate based on a difference between said instantaneous temperature and said second predetermined threshold.

18. The system recited in claim 16 wherein said controller further limits said desired rich air/fuel ratio reference value to a minimum predetermined limit value.

19. The system recited in claim 16 wherein said controller further sets said second predetermined threshold equal to said predetermined temperature.

20. The system recited in claim 16 wherein said second predetermined threshold represents a threshold temperature that if the emission control device is exposed to for a continuous period, the emission control device will operate without loss of efficiency.

\* \* \* \* \*